United States Patent [19]

Fuseya et al.

[11] Patent Number: 4,753,807

[45] Date of Patent: Jun. 28, 1988

[54] OIL OR FAT COATED 5'-RIBONUCLEOTIDES AND METHOD OF MAKING THE SAME

[75] Inventors: Yoshihiko Fuseya; Toru Tachikawa, both of Kawasaki, Japan

[73] Assignee: Ajinomoto Co., Inc., Tokyo, Japan

[21] Appl. No.: 18,416

[22] Filed: Feb. 25, 1987

[30] Foreign Application Priority Data

Mar. 17, 1986 [JP] Japan .................................. 61-59007

[51] Int. Cl.⁴ .......................... A23D 5/00; A23L 1/22
[52] U.S. Cl. ..................................... 426/99; 426/307; 426/537; 426/650
[58] Field of Search ................. 426/99, 302, 307, 537, 426/650

[56] References Cited

U.S. PATENT DOCUMENTS 3,389,000  6/1968  Fujita et al. ..................... 426/302 X
3,949,094  4/1976  Johnson et al. ....................... 426/99
4,687,669  8/1987  Moritaka et al. ............... 426/309 X Primary Examiner—Raymond N. Jones
Assistant Examiner—C. Callahan
Attorney, Agent, or Firm—Oblon, Fisher, Spivak, McClelland & Maier

[57] ABSTRACT

The invention relates to oil or fat coated 5'-ribonucleotides and a method of making the same.

7 Claims, No Drawings

OIL OR FAT COATED 5′-RIBONUCLEOTIDES AND METHOD OF MAKING THE SAME

BACKGROUND OF THE INVENTION

1. Field of the Invention

This invention relates to a coated substance comprising a 5′-ribonucleotide coated with a film-forming agent which melts when it is heated. More particularly, it relates to an oil or fat coated substance comprising a 5′-ribonucleotide and a coating film which does not break or melt at ordinary room temperature when placed in, for example, food containing water during its manufacturing process prior to heating, and which melts and thereby allows the 5′-ribonucleotide to dissolve in the water when it is heated to a high temperature.

2. Discussion of the Background

There are known coated additives for food which comprise cores coated with substances which melt only when they are heated. The cores are, for example, organic acids which are added to boiled fish paste ("kamaboko" in Japanese), sausages, etc. to lower their pH. Other examples of the core substances are 5′-ribonucleotides. The films with which the cores are coated do not melt at ordinary room temperatures and thereby prevent the destruction of the cores by the enzymes which the food contains. Normally, the enzymes lose their activity when they are heated.

Oils or fats, waxes, higher alcohols and gelatin are typically used for coating 5′-ribonucleotides to prevent them from being released at ordinary room temperatures (Japanese Patent Publication No. 3467/1965). Attempts have been made to achieve improved results and include treating the surfaces of 5′-ribonucleotides to make them lipophilic before coating them with oils or fats (Japanese Patent Publication No. 28677/1980) or coating 5′-guanylic acid with a mixture of an organic acid and an oil or fat (Japanese Laid-Open Patent Specification No. 96680/1981).

None of these methods are, however, very effective for preventing 5′-ribonucleotides from being released or lost during the manufacture of food. The products contain only a low percentage of 5′-ribonucleotides.

SUMMARY OF THE INVENTION

Accordingly, one object of the invention is to provide coated 5′-ribonucleotides which are not released through their oil or fat coating at room temperature.

Another object of the invention is to provide coated 5′-ribonucleotides which can be added to a variety of foods including fish-paste products without release of the 5′-ribonucleotides.

A further object of the invention is to provide coated 5′-ribonucleotides which are easily released through the oil or fat coating upon heating.

These objects and other objects of the invention have been achieved by the present oil or fat coated 5′-ribonucleotides, comprising:

5′-ribonucleotides coated with a solid film, wherein said film is comprised of (i) a solid fat or oil, (ii) an edible wax, and (iii) a lecithin.

If a certain amount of lecithin is added to an oil or fat, it is possible to form a coating film which reduces any release or loss of 5′-ribonucleotides and improves their stability.

A solid oil or fat or a mixture of a solid oil or fat and a wax is used as a coating material. There is no particular limitation to the oil or fat which should be used, as long as it is solid at ordinary room temperatures. It is, however, preferable to use extremely hardened beef tallow, hardened rapeseed oil or other hardened oil, or a solid oil or fat having a melting point of 40° C. to 70° C. Rice wax is a preferred wax, but it is also possible to use carnauba wax, candelilla wax, beeswax or the like.

A mixture of a solid oil or fat and a wax fails to attain a satisfactorily high melting point if it has too low a wax content. Therefore, it should contain from at least 5 parts to about 50 parts, preferably at least 10 parts, of wax based on the solid oil or fat. Addition of wax in amounts greater than 50 parts does not provide significant additional advantages. A more preferable mixture contains 5 to 20 parts of wax for 100 parts of the solid oil or fat.

Lecithin is added to the mixture of a solid oil or fat and an edible wax, or the oil or fat alone. It is possible to use soybean, rapeseed, corn, yolk or cotton seed lecithin, or any other lecithin without any limitation in particular. The lecithins may be used singly or a mixture thereof may be used. As lecithin is a substance separated from any oil seeds, egg yolk or the like, it often contains impurities in addition to phospholipid, especially triglycerides. While lecithin having only a low degree of refining and containing such impurities can be used for the purpose of this invention, it is important to add 0.1 to 5% of lecithin as phospholipid based on the weight of the solid oil or fat or the mixture thereof with the edible wax.

If less than 0.1% of lecithin is added, it is not possible to reduce the release or loss of 5′-ribonucleotides through the coating film. Although the release or loss can be reduced with an increase in the amount of the lecithin which is added, the loss increases again if too large an amount of lecithin is added. Therefore, it is important to add 0.1 to 5% of lecithin based on the weight of the solid oil or fat or the mixture thereof with the edible wax. A preferred range is from 0.5 to 3%.

When the film-forming material is applied, it is melted under heat, the core-forming 5′-ribonucleotides are admixed into the molten material and the molten material is cooled for solidification. The cooling and solidification can be carried out by a known method which relies upon, for example, dropping into cold water or spraying.

According to this invention, the film-forming material consisting mainly of a solid oil or fat and also containing lecithin enables the production of highly stable oil or fat coated 5′-ribonucleotides which are not released or lost when phosphatase is active.

Other features of the invention will become apparent in the course of the following descriptions of exemplary embodiments which are given for illustration of the invention and are not intended to be limiting thereof.

EXAMPLES

Example 1

Thirty parts by weight of sodium 5′-inosinate were dispersed in a solution containing 70 parts of a film-forming agent which had been prepared by adding a surface active agent to a hardened oil or a mixture of a hardened oil and a wax, as shown in TABLE 1. The dispersion was dropped onto a cooling belt to form solid particles. The particles were sieved to provide coated particles having a size of 840 to 1000 μm. A half gram of coated particles was placed in 100 g of hot water and the water was shaken for two hours. The percentage of the sodium 5'-inosinate which had been dissolved in the water was taken as a measure of the protectivity of the coating.

The results are shown in TABLE 1. The percentage of dissolved 5'-inosinate did not greatly decrease when sugar ester, polyglycerine fatty acid ester, monoglystearate, saponin or any other surface active agent was added. Rather, there was often an increase. When lecithin had been added, however, a clear reduction was shown.

TABLE 1

| Hardened oil | Wax % | Surface active agent | Dissolution % |
|---|---|---|---|
| Rapeseed oil | No wax added | No surface active agent added | 8 |
| | | Soybean lecithin 1% | 5 |
| | | Yolk lecithin 1% | 6 |
| | | Sugar ester HLB5 1% | 9 |
| | | Polyglypalmitate 1% | 12 |
| | | Monoglystearate 1% | 10 |
| | | Soybean oil 1% | 8 |
| Rapeseed oil | Rice wax 7.5% | No surface active agent added | 9 |
| | | Soybean lecithin 1% | 5 |
| | | Sugar ester HLB2 1% | 9 |
| | | Polyglypalmitate 1% | 11 |
| Beef tallow | Rice wax 10% | No surface active agent added | 7 |
| | | Soybean lecithin 1% | 3 |
| | | Sugar ester HLB2 1% | 6 |
| | | Polyglystearate 1% | 10 |
| | | Saponin 0.5% | 6 |
| | Rice wax 15% | No surface active agent added | 7 |
| | | Soybean lecithin 0.5% | 4 |
| | Candelilla wax 7.5% | No surface active agent added | 6 |
| | | Soybean lecithin 0.5% | 5 |

Example 2

A coating agent containing 7.5% of rice wax and any of the specific percentages of soybean lecithin as shown in TABLE 2 with the balance occupied by extremely hardened beef tallow was melted by heating to 80° C. Twenty parts of fine sodium 5'-inosinate powder and 10 parts of sodium 5'-guanylate were dispersed in 70 parts of the molted coating agent. The dispersion was cooled by spraying to form coated particles. The particles having a size of 350 to 420 μm were selected and the percentage of their dissolution was determined by the method described in Example 1. The results are shown in TABLE 2.

The percentage of the dissolution showed a gradual reduction when at least 0.1% of lecithin had been added. When the coating agent contained 2.5% or more of lecithin, it increased the viscosity of the dispersion so greatly that it was difficult and eventually impossible to spray the dispersion.

The optimum amount of lecithin was in the vicinity of 1.5%.

TABLE 2

| Lecithin % | Fluidity of dispersion | Dissolution % | Melting point °C. |
|---|---|---|---|
| 0 | Not good or bad | 12 | 66 |
| 0.1 | Not good or bad | 10 | 66 |
| 0.2 | Good | 8 | 66 |
| 0.3 | Good | 8 | 66 |
| 0.5 | Good | 8 | 66 |
| 1.0 | Not good or bad | 7 | 66 |
| 1.75 | Poor | 4 | 66 |
| 2.5 | Bad | 5 | 66 |
| 5 | Too bad to permit spraying | | 65 |

Example 3

Thirty parts by weight of sodium 5'-inosinate were dispersed in 70 parts by weight of a solution of any of the mixtures of extremely hardened beef tallow and soybean lecithin, of which the composition is shown in TABLE 3. The dispersion was cooled by spraying to prepared coated particles having a size of 350 to 420 μm. The percentage of their dissolution was determined by the method described in Example 1. Two kinds of extremely hardened beef tallow from two different manufacturers were employed.

The results are shown in TABLE 3. The addition of soybean lecithin improved both the dissolution and crushing strength of the particles. The optimum amount of the lecithin was found to be in the range of 0.5 to 5%.

The advantages of this invention were clearly shown, even though the results differed between the cases in which the beef tallow of one manufacturer had been used and those in which that of the other manufacturer was used.

TABLE 3

| Extremely hardened beef tallow | Soybean lecithin (%) | Dissolution (%) | Crushing strength (newton) | Fluidity of dispersion |
|---|---|---|---|---|
| Of manufacturer A | 0 | 17 | 0.09 | Good |
| | 0.25 | 14 | 0.11 | Good |
| | 0.5 | 9 | 0.12 | Good |
| | 1 | 7 | 0.16 | Good |
| | 2.5 | 4 | 0.13 | Good |
| | 5 | 6 | 0.12 | Good |
| | 7.5 | 10 | 0.11 | Good |
| Of manufacturer B | 0 | 5 | 0.12 | Poor |
| | 1 | 2 | 0.13 | Poor |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Oil or fat coated 5'-ribonucleotides, comprising:
   5'-ribonucleotides coated with a solid film, wherein said film consists essentially of (i) a solid fat or oil, (ii) 5–50 parts of an edible wax per 100 parts of said solid oil or fat, and (iii) 0.1–5% by weight of a lecithin.

2. The coated 5'-ribonucleotides of claim 1, comprising 0.5–3% lecithin.

3. The coated 5'-ribonucleotides of claim 1, wherein said oil or fat has a melting point of about 40°–70° C.

4. The coated 5'-ribonucleotides of claim 1, wherein said edible wax is rice wax, carnauba wax, candelilla wax or bees wax.

5. The coated 5'-ribonucleotides of claim 1, comprising 5–20 parts of wax per 100 parts of solid oil or fat.

6. A method of preparing oil or fat coated 5'-ribonucleotides, comprising the step of:
   coating a 5'-ribonucleotide with a molten mixture consisting essentially of (i) a melted fat or oil, (ii) an edible wax, and (iii) a lecithin, wherein said melted fat or oil is solid at ordinary room temperature, and cooling said coated 5'-ribonucleotides, whereby said molten mixture is solidified.

7. The process of claim 6, wherein said cooling step is performed by dropping into cold water or spraying.

* * * * *